UNITED STATES PATENT OFFICE.

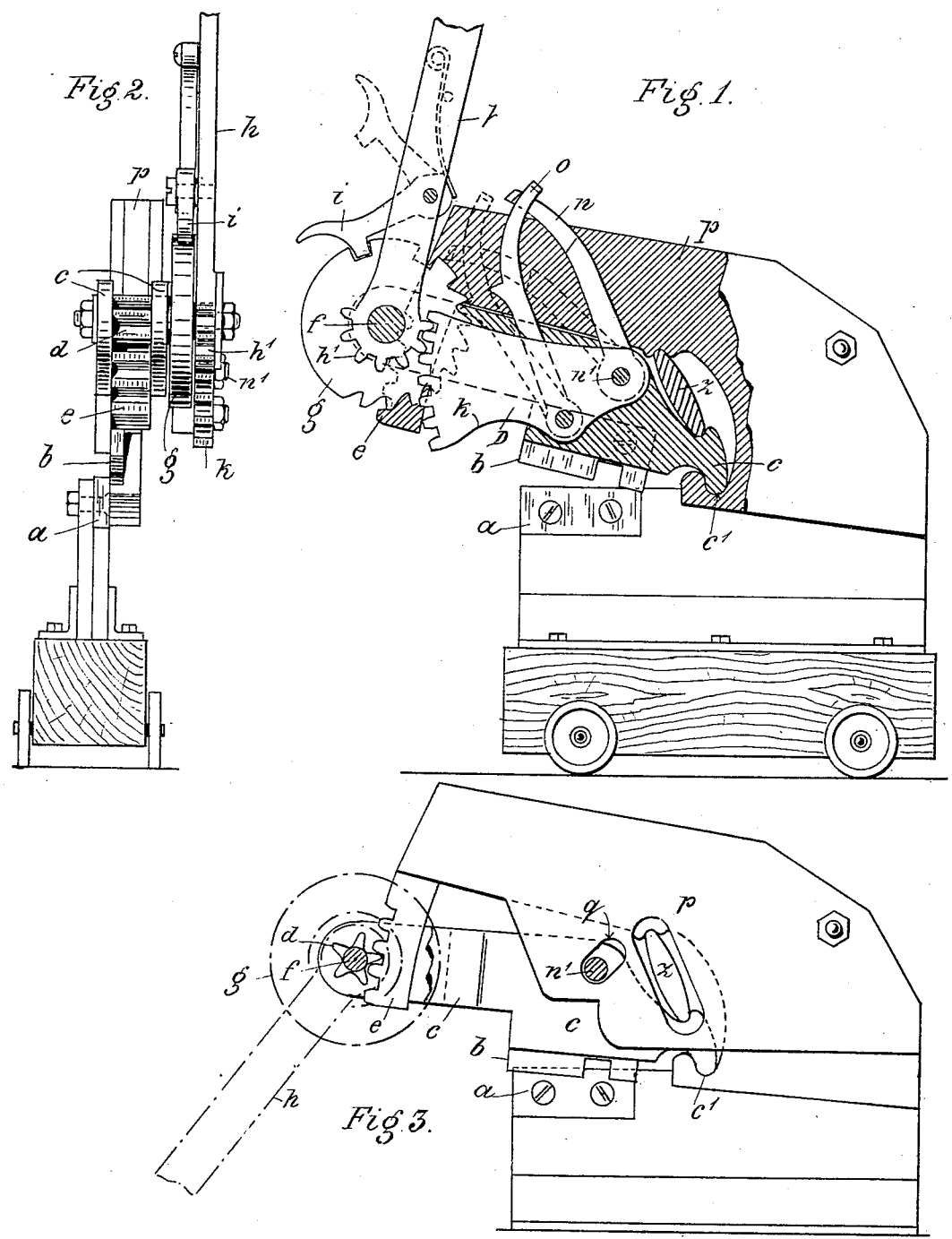

ANDREAS SCHÄRFL, OF MUNICH, GERMANY, ASSIGNOR TO WERKZEUG-MASCHINENFABRIK A. SCHÄRFL'S NACHFOLGER, OF SAME PLACE.

METAL CUTTING OR SHEARING MACHINE.

SPECIFICATION forming part of Letters Patent No. 625,421, dated May 23, 1899.

Application filed December 28, 1897. Serial No. 663,835. (No model.)

*To all whom it may concern:*

Be it known that I, ANDREAS SCHÄRFL, a subject of the King of Bavaria, and a resident of Munich, Kingdom of Bavaria, Germany, have invented certain new and useful Improvements in Metal Cutting or Shearing Machines, of which the following is a full, clear, and exact description.

This invention relates to machines for cutting or shearing metal plates; and it consists, substantially, in such features of improvement as will hereinafter be more particularly described.

The object of the invention primarily is to provide a machine of the character specified in which the force of the cutter or shearing blade can be increased at will to more readily effect the cutting of plates of varying degrees of thickness.

Other objects will more fully hereinafter appear when taken in connection with the accompanying drawings, in which—

Figure 1 is a side elevation with the outer plate partially removed to show the mechanism; Fig. 2, an end elevation, and Fig. 3 a side elevation with the tooth-segment and pawls removed.

The lower cutter $a$ is mounted on the base of the machine, which for the sake of convenience may be put on wheels or rolls. The upper movable cutter $b$ is mounted on the bifurcated lever-plate $c$, having projection $c'$ to engage a corresponding recess in the supporting overhanging arm $p$, comprising cheek-pieces $p'\,p'$, said lever-plate being prevented from falling out by means of a toggle-plate $z$, fitting between a recess of the lever-plate and one in the cheek-pieces $p'\,p'$. The lever-plate $c$ is bifurcated at its forward end and carries a spindle $f$, mounted therein, on which spindle is mounted the hand-lever $h$, having toothed segment $h'$ to engage a toothed segment $k$. This segment $k$ is formed on the front edge of a movable plate D, that is pivoted at $n'$ to the rear part of the lever-plate $c$, on which pivot $n'$ swings loosely a detent-pawl $n$. Pivoted to the lower part of the movable plate D is a pawl $o$, adapted at times to engage in teeth formed around half the periphery of a disk $g$, mounted on the spindle $f$ and having one or more notches formed on that part of its periphery which is not occupied by the said ratchet-teeth. With these notches, or rather with one of the same, a pawl $i$, (constituting the operating device for the removable cutter,) mounted on the hand-lever $h$, engages, said pawl being advantageously spring-pressed, as shown at Fig. 1. Rigidly attached to the said disk $g$ is a pinion $d$, centered on the spindle $f$ and meshing with teeth $e$, formed on the front edges of the cheek-pieces $p'\,p'$ of the overhanging arm $p$. The pivot $n'$ passes through an inclined slot $q$ in the arm $p$ to allow of the necessary movement of the lever-plate $c$, which carries the upper cutter or knife $b$.

The device operates in the following manner: If it is required to cut thin plate, the pawl $i$ is set in one of the notches of the disk $g$, so that the latter is coupled to the arm or hand-lever $h$, and the two pawls $n\,o$ are thrown up out of engagement with the ratchet-teeth. On moving the lever $h$ downwardly the pinion $d$ will roll down the teeth $e$ and the cutter $b$ and lever-plate $c$ be moved downward to cut the plate. If, however, the plate is thick and more power consequently required to shear the same, the pawl $i$ is thrown out of engagement and the pawl $o$ and detent-pawl $n$ brought into engagement with the ratchet-teeth of the disk $g$. If now the lever $h$ is turned downwardly, the segment or pinion teeth $h'$ will operate to raise the segment $k$ of the movable plate D on its pivot, thereby imparting motion to the pawl $o$, which will be raised and move the disk $g$ around one tooth, whereupon the detent-pawl engages and prevents a backward movement. Thus on working the hand-lever $h$ up and down several times the cutters will be operated once only, but with much increased force. To raise the lever-plate $c$ after each downward movement, the pawls $o\,n$ should be thrown out and the pawl $i$ thrown into engagement with the disk $g$, when the lever-plate $c$ may be raised in a single operation.

In virtue of the engagement of the pinion $d$ with the segmental rack on the front edge of the cheek-pieces of the overhanging arm $p$ the movable cutter is held in its upward position when the lever $h$ is turned to the position shown in Fig. 1. Such engagement also serves to guide the said cutter in its vertical movements, and the speed of the cutter is also regulated in its descent, so that the same is prevented from simply falling or dropping upon the plate to be cut, which would not permit or give the desired shearing action.

I claim as my invention—

1. The combination, in a metal cutting or shearing machine, of a fixed cutter, a movable cutter, and means interposed between the movable cutter and its operating device for increasing the force of said movable cutter at will.

2. The combination, in a metal cutting or shearing machine, of a fixed cutter, a movable cutter, and a lever for actuating the same, and means adapted to be thrown into operative connection between said lever and movable cutter for increasing the force of the latter.

3. The combination, in a metal cutting or shearing machine, of a fixed cutter, a movable cutter, and a lever for actuating the same, a plate pivoted to the movable cutter, and having movable connection with the lever, and means interposed between the movable cutter and its operating device and operated by said plate for increasing the force of the movable cutter at will.

4. The combination, in a metal cutting or shearing machine, of a fixed cutter, a movable cutter, a shaft supported by the movable cutter, a lever mounted on the shaft, a plate pivoted to the movable cutter, and having movable connection with the lever, and means interposed between the movable cutter and its operating device and operated by said plate for increasing the force of the movable cutter at will.

5. The combination, in a metal cutting or shearing machine, of a fixed cutter, a movable cutter, a shaft carried by the movable cutter, and a lever mounted on the shaft, a plate pivoted to the movable cutter, and having movable connection with the lever, a ratchet-disk also on the shaft, and means, operated by the plate, adapted to be thrown into engagement with said disk for moving the same simultaneously with the descent of the movable cutter.

6. The combination, in a metal cutting or shearing machine, of a fixed cutter, a movable cutter, a shaft carried by the movable cutter, and a lever mounted on the shaft, a ratchet-disk also on the shaft, a pivoted movable pawl adapted to be thrown into engagement with said disk, and means operated from the lever for actuating the pawl to move the disk simultaneously with the descent of the movable cutter.

7. The combination, in a metal cutting or shearing machine, of a fixed cutter, a movable cutter, a shaft carried by the movable cutter, and a lever mounted on the shaft, a plate pivoted to the movable cutter, and having movable connection with the lever, a ratchet-disk also on the shaft, a pawl pivoted to the plate and adapted to be thrown into engagement with the disk, and a detent also engaging said disk.

8. The combination, in a metal cutting or shearing machine, of a fixed cutter, a movable cutter, a shaft carried by the movable cutter, and a lever mounted on the shaft, a disk also mounted on the shaft, and engaging a stationary rack, and means for throwing said lever into operative connection with said disk.

9. The combination in a metal cutting or shearing machine, of the overhanging arm having the rack at the front edge thereof, a stationary cutter, a movable cutter pivoted to said arm, a shaft carried by the movable cutter, and a hand-lever mounted on the shaft, a ratchet-disk also on the shaft, and having a pinion turning in the rack, a plate pivoted to the movable cutter, and having a toothed segment engaged by the lever, and a pawl pivoted to the plate and adapted to engage said disk.

10. The combination, in a metal cutting or shearing machine, of a rack, a fixed cutter, a movable cutter, a shaft carried by the movable cutter, and a lever mounted on the shaft, a notched disk on the shaft having a pinion turning in the said rack, and a spring-pressed pawl on the lever adapted to be thrown into engagement with the notches in the disk.

11. In a plate-shearing tool, the combination of a fixed cutter and a movable cutter, a movable lever-plate to hold said latter cutter, an overhanging arm in which said lever-plate is mounted and a fixed segment to said arm, a hand-lever mounted in the end of said lever-plate, a pinion to engage with said fixed segment and lower said lever-plate when turned, a ratchet mechanism fast to said pinion and a pawl mechanism on said movable lever-plate and means for coupling the hand-lever to the pinion direct or to the ratchet-wheel-actuating-pawl mechanism substantially as described.

12. The combination of a fixed cutter and a movable cutter, a lever-plate to carry the latter, said lever-plate being vertically movable, an overhanging arm to support said plate, a segment mounted in said lever-plate, and carrying a pawl, a hand-lever revolubly mounted in the end of said lever-plate, a fixed segment on said overhanging arm, and pinion mounted on said hand-lever spindle, a ratchet-wheel fast on said pinion in which said pawl engages, and means in connection with said hand-lever for coupling the same to said pinion or to the pawl-actuating segment substantially as described.

In testimony whereof I have signed my name to this specification in the presence of two subscribing witnesses.

ANDREAS SCHÄRFL.

Witnesses:
G. OBERNDORF,
EMIL HENZEL.